(12) United States Patent
Horiuchi et al.

(10) Patent No.: US 6,188,508 B1
(45) Date of Patent: Feb. 13, 2001

(54) CONTROL SIGNAL SUPERIMPOSER

(75) Inventors: Yukio Horiuchi; Masatoshi Suzuki; Shu Yamamoto; Shigeyuki Akiba, all of Kamifukuoka (JP)

(73) Assignees: KDD Corporation; KDD Submarine Cable Systems, Inc., both of Tokyo (JP)

( * ) Notice: Under 35 U.S.C. 154(b), the term of this patent shall be extended for 0 days.

(21) Appl. No.: 09/324,395

(22) Filed: Jun. 3, 1999

(30) Foreign Application Priority Data

Jun. 3, 1998 (JP) .................................................. 10-154199

(51) Int. Cl.[7] ...................................................... H01S 3/00
(52) U.S. Cl. ............................ 359/334; 359/341; 359/345
(58) Field of Search ..................................... 359/341, 345, 359/334

(56) References Cited

U.S. PATENT DOCUMENTS

| | | | |
|---|---|---|---|
| 5,479,424 | * 12/1995 | Sakuyama | 372/26 |
| 5,668,658 | * 9/1997 | Hamada | 359/341 |
| 5,926,304 | * 7/1999 | Tajima | 359/174 |
| 6,115,174 | * 4/2000 | Grubb et al. | 359/334 |

* cited by examiner

Primary Examiner—Mark Hellner
(74) Attorney, Agent, or Firm—Christie, Parker & Hale, LLP (57) ABSTRACT

A control signal superimposer for superimposing a control signal on a signal light, comprising a pumping light source for generating a pumping light with intensity fluctuation in accordance with the control signal; a Raman amplification medium pumped by the pumping light from the pumping light source for Raman-amplifying the signal light; a combiner for combining the pumping light output from the pumping light source and the signal light to be Raman-amplified and then supplying them to the Raman amplification medium; and an optical filter for extracting the signal light component from the output light of the Raman amplification medium and terminating the pumping light component.

13 Claims, 6 Drawing Sheets

Fig. 1

Fig. 2(a) Control signal

Fig. 2(b) Pumping light

Fig. 2(c) Input signal light

Fig. 2(d) Output signal light

CONTROL SIGNAL SUPERIMPOSER

FIELD OF THE INVENTION

This invention relates to a control signal superimposer, and more specifically, to a control signal superimposer for superimposing or multiplexing a control signal on a signal light in an optical transmission system.

BACKGROUND OF THE INVENTION

In optical transmission systems, especially in optical transmission systems in which a signal light is amplification-repeated and/or branched off in the middle, it is necessary to remotely control optical repeaters or branching units. Also, in optical networks, it is necessary to transmit network control information separately from the signal light.

Therefore, an arrangement has been proposed in which the signal light whose signal is conventionally transmitted as NRZ pulses, RZ pulses or soliton waves is again intensity-fluctuated with a control signal of relatively low frequency and then propagated on optical fiber transmission lines.

As means for superimposing or multiplexing the control light in the signal light, an arrangement has been well known that uses a structure of optical amplifier consisting of an erbium doped optical fiber, an intensity of its pumping light being modulated with the control signal. That is, gain of an erbium doped optical fiber is fluctuated in accordance with the control signal and, thus, intensity level of the signal light is fluctuated according to the control signal.

However, the gain fluctuation of the erbium doped optical fiber can follow approximately 100 kHz at the most. This is not enough for superimposing the control signal.

Furthermore, in the conventional systems, when the pumping light is disappeared or the intensity is largely reduced due to trouble of a pumping light source or the like, the erbium doped optical fiber plays a role of loss medium and considerably attenuates the signal light.

An object of the invention is to solve the foregoing problems and provide a control signal superimposer for superposing the control signal on the signal light.

Namely, the object of the invention is to provide a control signal superimposer capable of responding at high speed.

An another object of the invention is to provide a control signal superimposer capable of transmitting the signal light with substantially no loss even in case of trouble of the pumping light.

A further object of the invention is to provide a control signal superimposer not causing any harmful influence such as nonlinear effect to the signal light itself.

SUMMARY OF THE INVENTION

The control signal superimposer according to the invention comprises a pumping light source for generating pumping light with intensity fluctuation in accordance with control signal; a Raman amplification medium pumped by a pumping light from the pumping light source for Raman-amplifying a signal light; a combiner for combining the pumping light output from the pumping light source and the signal light and applying them to the Raman amplifying medium; and an optical filter for extracting the signal light component in the output light from the Raman amplifying medium and terminating the pumping light component.

Since the gain of Raman amplification can fluctuate easily following up to several 10 MHz of frequency, which is the frequency generally used for the control signal, it is possible to transmit high speed control signal. By employing the Raman amplification, a wider signal wavelength band can be ensured as the modulation frequency band widens. Also, polarization dependence is hardly appeared.

While a 1.5 $\mu$m band is used for the signal light in long distance optical fiber transmission systems, a 1.4 $\mu$m band can be used for the pumping light. Therefore, it is possible to employ laser elements of satisfactory results at a low price.

To put it more precisely, the signal light belongs to the 1.55 $\mu$m band and the pumping light belongs to within the range from 1.44 to 1.49 $\mu$m band.

The pumping light source comprises a laser light source and a light source driver for driving the laser light source.

The driver applies a driving current, which amplitude changes according to the control signal, to the laser light source. Consequently, the pumping light which intensity fluctuates according to the control signal desired to be superimposed on the signal light can be easily generated.

The Raman amplification medium comprises a medium being low loss toward the signal light in case of the absence of the pumping light. Therefore, even if the pumping light source develops some trouble, the unpumped Raman amplification medium scarcely gives a harmful influence to the signal light. Consequently, a system of high reliability can be realized. The Raman amplification medium comprises for instance a silica optical fiber.

The optical filter comprises a selective transmission reflecting element for transmitting the signal light component alone in the output light from the Raman amplifying medium and reflecting the pumping light component toward another direction. The optical filter also comprises a separator for separating the signal light component and the pumping light component in the output light of the Raman amplifying medium, and an optical terminator for terminating the pumping light component separated by the separator.

This invention further comprises a modulation depth detector for detecting the modulation depth of the signal light output from the optical filter, and a comparator for comparing the modulation depth detected by the modulation depth detector with a desired modulation depth and outputting a signal to indicate the difference. According to the output from the comparator, the pumping light source adjusts amplitude of the intensity fluctuation in accordance to the control signal to be appropriate value. Consequently, the intensity modulation depth of the signal light can be constantly maintained and thus it prevents the signal light to be overly modulated.

When the control signal comprises an amplitude modulated signal, a sample-and-hold circuit should be provided for sampling and holding the data such as the detected modulation depth, the magnitude of a fluctuation component in the signal light component output from the optical filter, or the comparative result obtained by the comparator, in accordance with the data value of the control signal.

DESCRIPTION OF THE PREFERRED EMBODIMENTS

Embodiments of the invention are explained below in detail with reference to the drawings.

Figure 1:
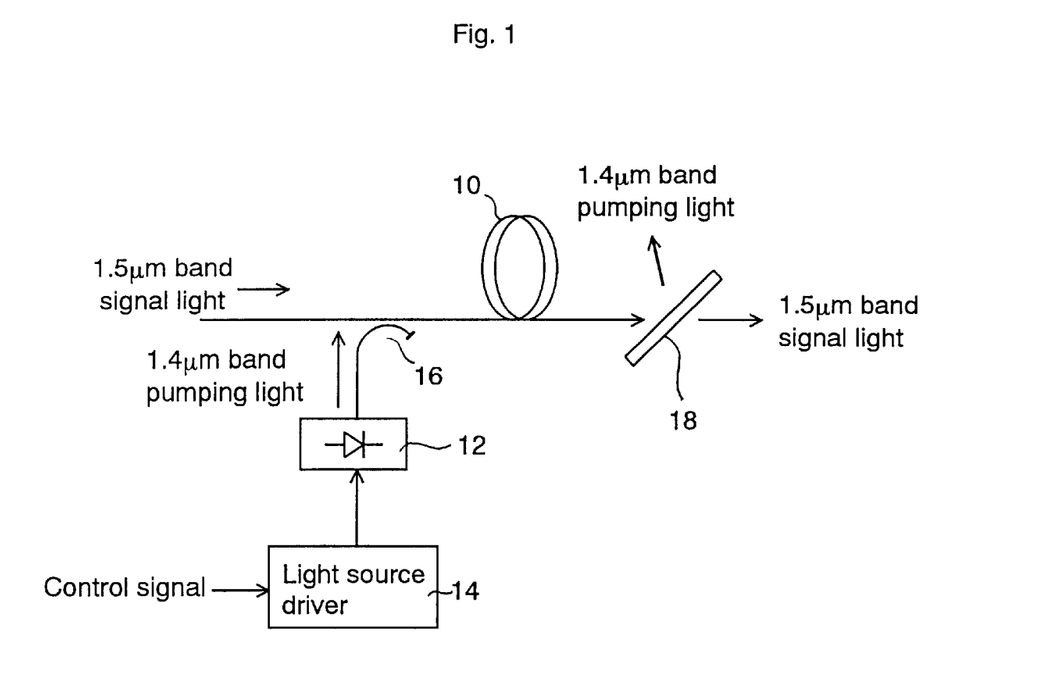
FIG. 1 shows a schematic block diagram of a first embodiment of the invention.

FIG. 1 shows a schematic block diagram of a first embodiment. In the embodiment, the Raman amplification to use nonlinear optical effect is employed in place of an active optical amplification medium such as an erbium doped optical fiber. Namely, numeral 10 denotes an optical fiber comprising a certain degree or more of nonlinear effect such as an ordinary silica optical fiber or an optical fiber having a mode field of specially small diameter. A signal light of 1.5 μm band enters the optical fiber 10.

Numeral 12 denotes a 1.4 μm band laser diode and acts as a pumping light source causing the Raman amplification on the optical fiber 10. Since the Raman amplification has the maximum gain on the longer wavelength side of approximately 100 nm toward pumping light, a 1.4 μm band is sufficient for a wavelength of the pumping light as against the 1.5 μm band signal light. Although 1.45 μm is preferable as a wavelength of the pumping light to obtain the maximum gain on a 1.55 μm band used in a long distance optical fiber transmission system, 1.48 μm is also sufficient. Practically speaking, a oscillating wavelength of the laser diode 12 is sufficient between 1.44 μm and 1.49 μm. The 1.48 μm band laser diodes already have given many satisfactory results and can be obtained at a relatively low price.

Numeral 14 denotes a light source driving circuit for continuously laser-oscillating the laser diode 12. A driving current applied to the laser diode 12 from the light source driving circuit 14 is modulated according to the control signal desired to be transmitted. For instance, the light source driving circuit 14 applies the driving current to the laser diode 12, in the driving current the input control signal (or the signal which amplitude is being adjusted) being superimposed on a bias current higher than the laser oscillating threshold value of the laser diode 12.

The control signal itself comprises a phase modulated signal obtained from modulating a continuous carrier through phase-shift-keying or a frequency modulated signal obtained from modulating the continuous carrier through frequency-shift-keying.

The pumping light output from the laser diode 12 is introduced to the optical fiber 10 through a wavelength division multiplexing optical coupler 16. In order to superimpose the control signal on the 1.5 μm band signal light through the Raman amplification, it is necessary to propagate the 1.5 μm band signal light desired to be amplified and the pumping light in the same direction. For that reason, the WDM coupler 16 is disposed on the input side of the signal light on the optical fiber 10.

On the output side of the signal light on the optical fiber 10, an optical filter 18 for transmitting the 1.5 μm band signal light is provided. Assuming that the 1.4 μm band pumping light once transmitted the optical fiber 10 returns to the optical fiber 10 again, the Raman amplification gain becomes unstable. There is a possibility that it causes reduction or fluctuation of the intensity of the control signal component superimposed on the 1.5 μm band signal light. Therefore, the optical filter 18 needs to terminate (namely, non-transmissive and reflectionless) the 1.4 μm band optical component. For instance, as illustrated in the drawing, the optical filter 18 should comprise an interference filter such as an etalon filter for transmitting the 1.5 μm band optical component and reflecting the 1.4 μm band optical component toward any directions except for the waveguide direction to the optical fiber 10.

Figure 2A:
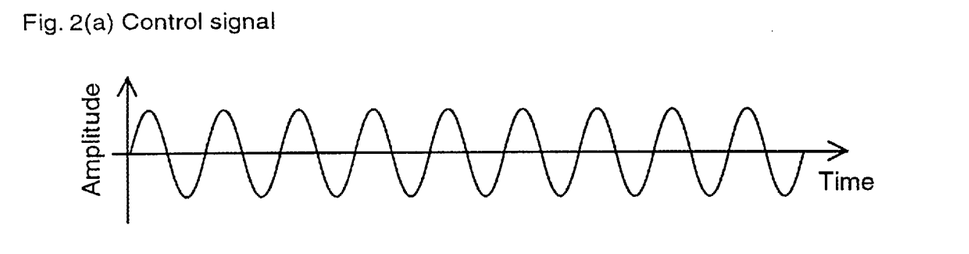
FIGS. 2(a)–2(d) show waveforms of respective parts of the embodiment shown in FIG. 1.
Figure 2B:
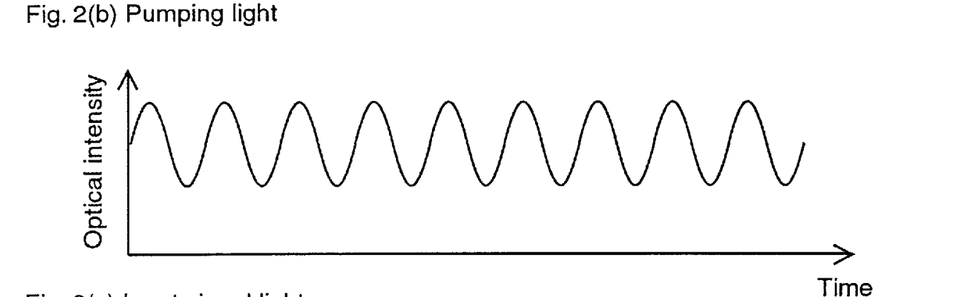

FIGS. 2(a)–2(d) illustrate signal waveforms of the respective parts. FIG. 2(a) shows a waveform of the control signal applied to the light source driving circuit 14. FIG. 2(b) shows optical intensity of the pumping light output from the laser diode 12. As the driving current to be applied to the laser diode 12 from the light source driving circuit 14 is amplitude-modulated by the control signal shown in FIG. 2(a) over the threshold current for continuously laser oscillating the laser diode 12, the optical intensity of the pumping light (FIG. 2(b)) output from the laser diode 12 fluctuates according to the amplitude variation of the control signal (FIG. 2(a)).

Figure 2C:
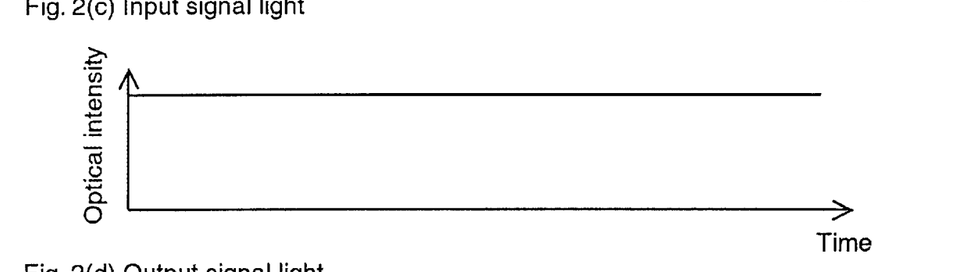

FIG. 2(c) shows intensity variation of the 1.5 μm band signal light input to the optical fiber 10. As a practical matter, it comprises a pulse train of NRZ pulses, RZ pulses or soliton pulses of a very high frequency. However, since the variation of the control signal (FIG. 2(a)) are quite slow compared to the bit rate of the pulse train, the signal light are shown as if the intensity stays unchanged in FIG. 2(c).

The signal light shown in FIG. 2(c) and the pumping light shown in FIG. 2(b) are combined by the WDM coupler 16 so as to enter the optical fiber 10 and then they propagate the optical fiber 10 in the same direction. At that time, the Raman amplification occurs as the nonlinear optical effect of the optical fiber 10. FIG. 3 shows gain fluctuation in accordance with intensity variation of the pumping light at the Raman amplification. The optical fiber 10 is pumped by the 1.4 μm band pumping light shown in FIG. 2(b) and acts as an optical amplification medium for amplifying the 1.5 μm band signal light shown in FIG. 2(d). At this time, the gain of the optical fiber 10 fluctuates according to the intensity variation of the pumping light. As a result, the intensity of the 1.5 μm band signal light fluctuates according to the intensity change of the pumping light (FIG. 2(b)).

Figure 2D:
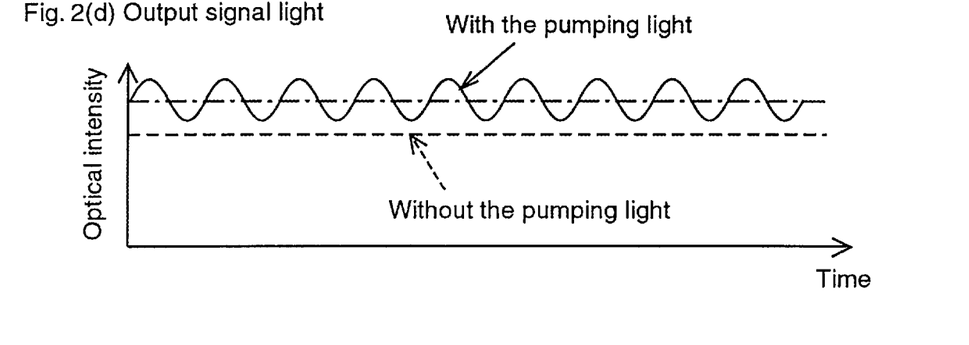
Figure 3:
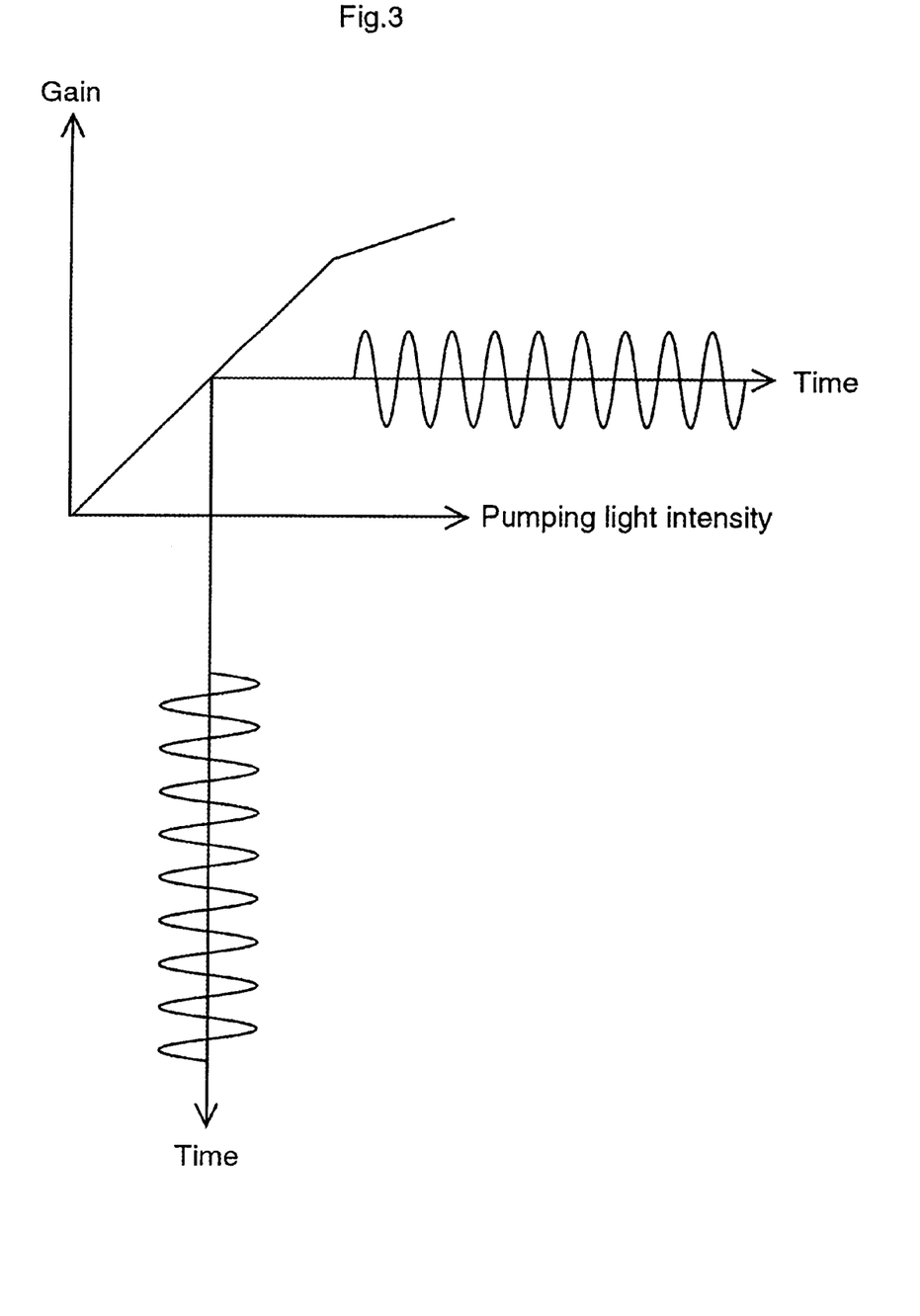
FIG. 3 shows a characteristic diagram of gain fluctuation in accordance with intensity variation of a pumping light at Raman amplification.

FIG. 2(d) shows intensity variation of the 1.5 μm band signal light output from the optical fiber 10 (or optical filter 18). In FIG. 2(d), the solid line shows intensity change of the 1.5 μm band signal light when the 1.4 μm band pumping light exists, the alternate long and short dash line shows average intensity of the Raman amplification, and the broken line shows intensity change of the 1.5 μm band signal light when the 1.4 μm band pumping light does not exist. The alternate long and short dash line also shows intensity of the signal light when the 1.4 μm band pumping light alone exists without the control signal. When the 1.4 μm band pumping light does not exist, the 1.5 μm band signal light merely attenuates due to the characteristic loss of the optical fiber 10. The loss does not fluctuate with the passage of time. The upper part over the broken line shows the contribution of the Raman amplification pumped at the 1.4 μm band.

In FIG. 2(d), the difference between the alternate long and short dash line and the broken line is equivalent to the Raman amplification gain. When superimposing the control signal on the 1.5 μm band signal light, if the modulation depth of the pumping light intensity is set to 0%, the intensity of the 1.5 μm band signal light output from the optical fiber 10 is constantly maintained at the level of the alternate long and short dash line. On the other hand, even if the modulation depth of the pumping light intensity is set to 100%, the minimum intensity of the signal light output from the optical fiber 10 does not fall lower than the signal light intensity (the dotted line) without the pumping light. Therefore, if the Raman amplification gain is controlled through adjustment of the pumping light power, the intensity modulation depth of the 1.5 μm band signal light, namely the amplitude of the control signal to be superimposed can be controlled. That is, when the Raman amplification gain is 0.5 dB, the amplification factor becomes 1.122 times. Also, the maximum value of half-amplitude value of the control signal becomes 0.122, and the maximum intensity modulation depth of the 1.5 μm band signal light is limited to about 11%. Similarly, if the Raman amplification gain is 0.2 dB, the maximum intensity modulation depth is limited to about 4.5%. As explained above, controlling the Raman amplification gain prevents the control signal component in the 1.5 μm band signal light from being over-modulated.

Figure 4:
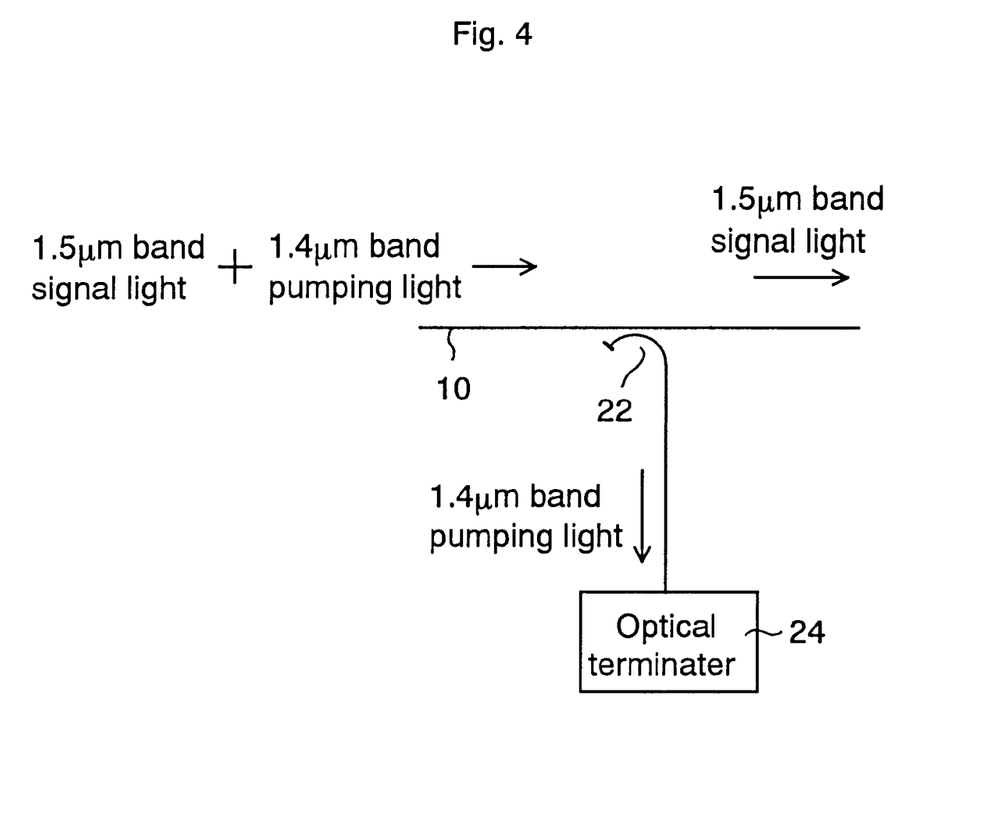
FIG. 4 shows a schematic block diagram of the alternative optical apparatus of an optical filter 18.

In place of the optical filter 18, a separator shown in FIG. 4 can be employed. A wavelength division multiplexing coupler 22 for extracting 1.4 μm band optical component alone is disposed adjacent to the output side of the optical fiber 10. The wavelength division multiplexing coupler 22 extracts the 1.4 μm band optical component alone from the light (1.5 μm band signal light and 1.4 μm band pumping light) propagating on the optical fiber 10. An optical terminator 24 terminates the extracted 1.4 μm band optical component. The 1.5 μm band signal light continues to propagate on the optical fiber 10 and outputs toward an outside optical fiber transmission line.

Figure 5:
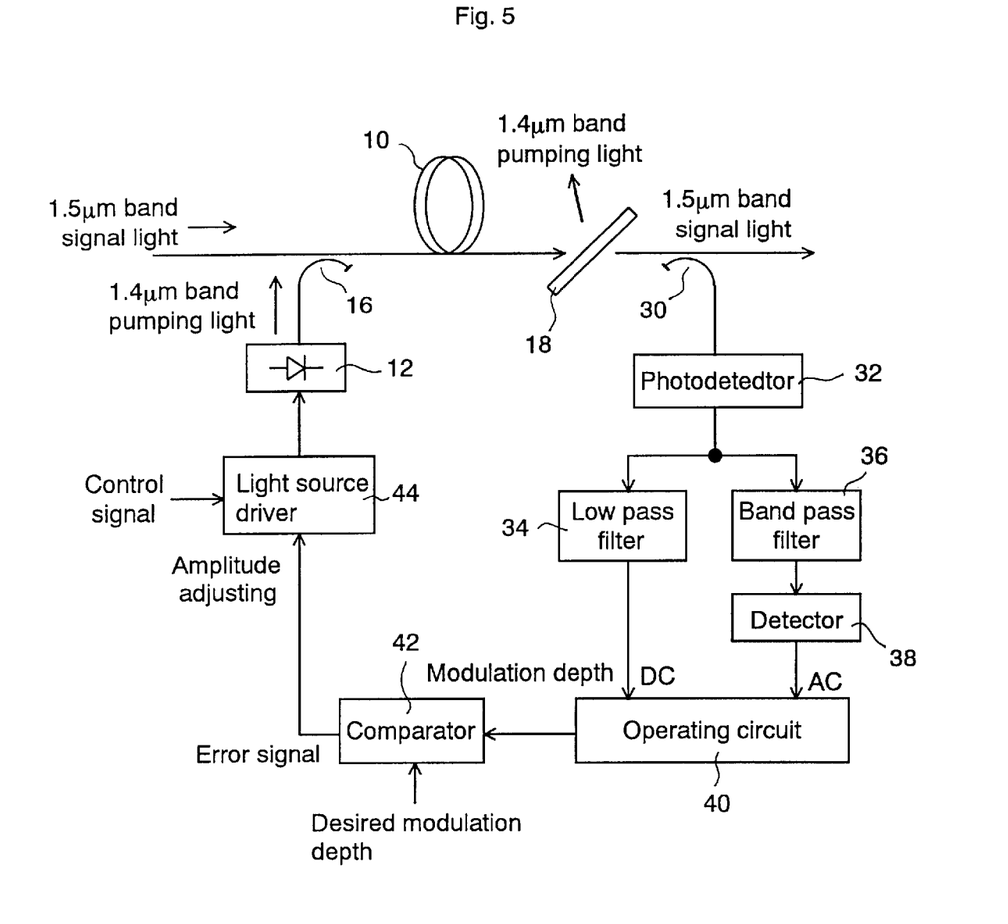
FIG. 5 shows a schematic block diagram of a second embodiment of the invention.

FIG. 5 shows a schematic block diagram of an embodiment for maintaining intensity modulation depth of the 1.5 μm band signal light at a constant level. It measures the modulation depth of the 1.5 μm band signal light after the Raman amplification and adjusts amplitude of driving current of a 1.4 μm band laser diode. Identical elements are labeled with reference numerals common to those in FIG. 1.

A splitter 30 separates the 1.5 μm band signal light output from the optical filter 18 in two portions and outputs the greater portion intact toward the outside while sending the rest to a photodetector 32. The photodetector 32 converts the input light into an electric signal.

The output from the photodetector 32 is applied to a low pass filter 34 and a band pass filter 36. The low pass filter 34 extracts DC component from the output of the photodetector 32 and applies it to an operating circuit 40. The band pass filter 36 extracts frequency component of the control signal from the output of the photodetector 32. A detecting circuit 38 detects the output of the band pass filter 36 and applies the result into the operating circuit 40. Consequently, respective intensity values of both DC and AC components in the 1.5 μm band signal light output from the optical filter 18 enter the operating circuit 40.

The operating circuit 40 calculates the modulation depth from both inputs and applies the result to a comparator 42. The comparator 42 compares the modulation depth supplied by the operating circuit 40 with a desired modulation depth, and outputs signals showing the error between them. A light source driving circuit 44, similar to the light source driving circuit 14, generates driving current for changing its amplitude in accordance with the input control signal at the current not lower than the laser oscillation threshold current of the laser diode 12, and applies it to the laser diode 12. The light source driving circuit 44 further adjusts the fluctuation amplitude of the driving current according to the error signal from the comparator 42.

The intensity modulation depth of the 1.5 μm band signal light can be maintained at a constant value by using the foregoing feedback control. Therefore, the modulation depth of the control signal component in the 1.5 μm band signal light can be kept stably.

In the above mentioned embodiments, although the driving current of the laser diode 12 to become the pumping light source of the Raman amplification was modulated by the control signal, it is obvious that the intensity of the pumping light of the Raman amplification can be modulated in accordance with the control signal.

In the foregoing embodiments, the control signal is superimposed on the signal light using the Raman amplification. Therefore, even if any trouble occurs at the pumping light source of the Raman amplification, the Raman amplification medium is highly reliable since it shows no loss or low loss characteristics toward the signal light and hardly gives them a bad influence.

In the Raman amplification, because its gain can be changed easily following frequencies up to several ten MHz, which are the frequencies generally used for the control signal, it permits to transmit high-speed control signal. Employing the Raman amplification widens the modulation frequency band and, as a result, the signal wavelength band can be widened. Also, the polarization dependence is quite limited.

In the embodiment shown in FIG. 5, there is no problem as far as the control signal is a frequency shift keying modulated signal or a phase shift keying modulated signal. However, if the control signal is for example an amplitude shift keying (ASK) modulated signal, it is impossible to maintain the modulation depth at a constant level using the structure shown in FIG. 5 due to the interruption of the control signal.

To solve the above problem, the time constant of the detecting circuit 38 should be made sufficiently longer than the data modulation rate of the ASK. In such a case, when a mark factor is for example one half, the output of the detecting circuit 38 becomes half (the average of '0' and '1') compared to the case that the amplitude of the control signal is constant with time. This problem can be solved measuring the actual modulation depth of '1' and adjusting the modulation depth set value so that the found value becomes the initial value.

Figure 6:
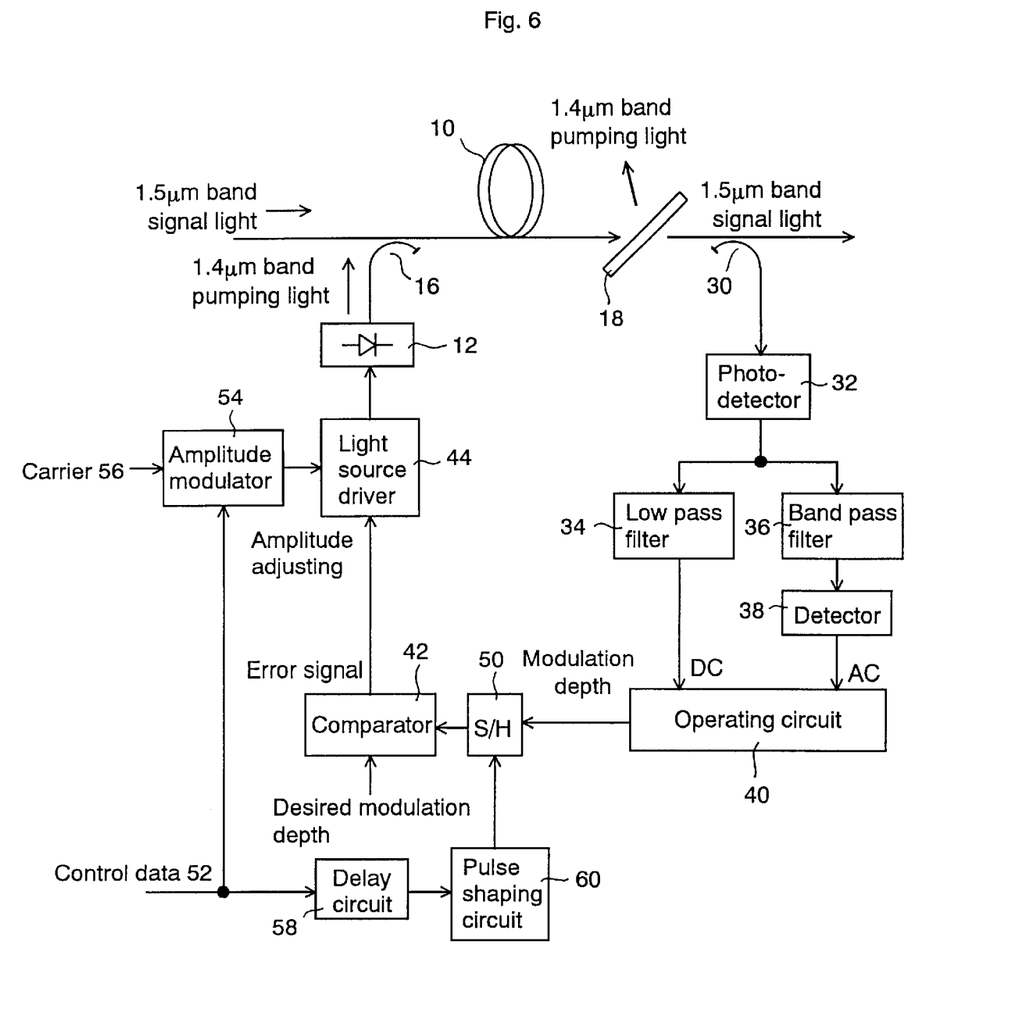
FIG. 6 shows a schematic block diagram of a third embodiment of the invention.

Alternatively, the circuit design shown in FIG. 5 can be modified as the one shown in FIG. 6. Identical elements are labeled with reference numerals common to those in FIG. 5. To put it concretely, a sample-and-hold circuit 50 is provided between the output of the operating circuit 40 and the input of the comparator 42, and the sample-and-hold circuit 50 is set to sample the output of the operating circuit 40 while the control data (binary signal) 52 to be transmitted are '1' and to hold it while the control data are '0'.

The amplitude modulating circuit 54 ASK-modulates a carrier 56 with the control data 52 to be transmitted, and applies the control signal (the ASK modulated signal) to the light source driving circuit. The control data 52 are also adjusted their timing through a delay circuit 58 and applied to a pulse shaping circuit 60. The delay circuit 58 is disposed for compensating the propagation delay of the optical fiber 10 and circuit delay and used for maintaining timing between the measured result of modulation depth by the operating circuit 40 and the sampling and holding of the sample-and-hold circuit 50. The pulse shaping circuit 60 generates trigger pulses for sampling and holding of the sample-and-hold circuit 50 by waveform-shaping the control data pulses from the delay circuit 58, and applies them to a control terminal of the sample-and-hold circuit 50. The sample-and-hold circuit 50 operates as stated above according to the trigger pulses. The pulse shaping circuit 60 is provided for shifting the sampling timing at the pulse rise time and pulse fall time of the control data 52 to avoid transient responses of a control loop system. When the control data 52 comprises NRZ pulses, the pulse shaping circuit 60 can be the one for converting the NRZ pulses into RZ pulses.

The sample-and-hold circuit 50 can be disposed between the detecting circuit 38 and the operating circuit 40, or also between the comparator 42 and the light source driving circuit 44.

The pumping light of the Raman amplification is not necessarily to be a single wavelength light. Using the plurality of pumping light sources of different wavelengths can improve the wavelength dependence of the Raman amplification gain. Namely, it is possible to flatten the gain distribution of the Raman amplification toward wavelengths.

As readily understandable from the foregoing description, according to the invention, the control signal can be superimposed on the signal light using the quite simple structure. Furthermore, even if the pumping light source used in the structure has some trouble, a bad influence to the signal light is scarcely given. The modulation frequency band and the signal wavelength band can be widened, and also show the low polarization dependence. Moreover, the intensity modulation depth of the signal light can be controlled with a simple structure, and the modulation depth of the control signal component can be maintained constantly. Controlling the Raman amplification gain also makes it possible to prevent the signal light from being overly modulated.

While the invention has been described with reference to the specific embodiment, it will be apparent to those skilled in the art that various changes and modifications can be made to the specific embodiment without departing from the spirit and scope of the invention as defined in the claims.

What is claimed is:

1. A control signal superimposer for superimposing a control signal on a signal light, comprising:
    a pumping light source for generating a pumping light with intensity fluctuations in accordance with the control signal;
    a Raman amplification medium pumped by the pumping light from the pumping light source for Raman-amplifying the signal light, said Raman amplification medium having output light comprising a light signal component and a pumping light component;
    a combiner for combining the pumping light from the pumping light source and the signal light to be Raman-amplified and supplying such combined light to the Raman amplification medium; and
    an optical filter for extracting the signal light component from the output light of the Raman amplification medium and terminating the pumping light component.

2. The control signal superimposer of claim 1 wherein the signal light has a signal wavelength within a 1.5 µm band and the pumping light has a pumping wavelength within a 1.4 µm band.

3. The control signal superimposer of claim 1 wherein the signal light has a signal wavelength within a 1.55 µm band and the pumping light has a pumping wavelength within the range from 1.44 to 1.49 µm.

4. The control signal superimposer of claim 1 wherein the pumping light source comprises a laser light source and a light source driver for driving the laser light source, the light source driver applying a driving current having an amplitude which fluctuates according to the control signal into the laser light source.

5. The control signal superimposer of claim 1 wherein the Raman amplification medium comprises a low loss medium to the signal light when the pumping light is not present.

6. The control signal superimposer of claim 5 wherein the Raman amplification medium comprises a silica optical fiber.

7. The control signal superimposer of claim 1 wherein the optical filter comprises a selective transmission reflector for transmitting the signal light component in the output of the Raman amplification medium and reflecting the pumping light component.

8. The control signal superimposer of claim 1 wherein the optical filter comprises a separator for separating the signal light component and the pumping light component in the output light of the Raman amplification medium and an optical terminator for terminating the pumping light component separated by the separator.

9. The control signal superimposer of claim 1 further comprising a modulation depth detector for detecting the modulation depth of the extracted signal light component from the optical filters and a comparator for comparing the modulation depth detected by the modulation depth detector with a desired modulation depth and outputting an error signal, wherein an amplitude of the intensity fluctuations of the pumping light is adjusted by the pumping light source according to the error signal output from the comparator to maintain a substantially constant modulation depth of the extracted signal light component from the optical filter.

10. The control signal superimposer of claim 9 wherein the control signal comprises an amplitude modulated signal and the modulation depth detector comprises a sample-and-hold circuit for sampling and holding a predetermined signal according to a data value of the control signal.

11. The control signal superimposer of claim 10 wherein the predetermined signal comprises the detected modulation depth.

12. The control signal superimposer of claim 10 wherein the predetermined signal comprises a magnitude of fluctuation component of the extracted signal light component from the optical filter.

13. The control signal superimposer of claim 9 wherein the control signal comprises an amplitude modulated signal and the comparator comprises a sample-and-hold circuit for sampling and holding the error signal according to the data value of the control signal.

* * * * *